United States Patent
Schiele

(10) Patent No.: US 7,360,616 B2
(45) Date of Patent: Apr. 22, 2008

(54) METHOD FOR CONTROLLING AND REGULATING A POWER TRAIN OF A HYBRID VEHICLE AND POWER TRAIN OF A HYBRID VEHICLE

(75) Inventor: Peter Schiele, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 363 days.

(21) Appl. No.: 11/010,971

(22) Filed: Dec. 13, 2004

(65) Prior Publication Data
US 2005/0155803 A1 Jul. 21, 2005

(30) Foreign Application Priority Data
Jan. 15, 2004 (DE) .................... 10 2004 002 061

(51) Int. Cl.
| | |
|---|---|
| B60K 1/00 | (2006.01) |
| B60K 6/00 | (2007.10) |
| B60K 1/02 | (2006.01) |
| B62D 11/02 | (2006.01) |
| B60W 10/02 | (2006.01) |
| B60W 10/08 | (2006.01) |
| H02P 7/00 | (2006.01) |
| F16H 3/72 | (2006.01) |

(52) U.S. Cl. .................. 180/65.2; 180/65.6; 180/65.7; 477/1; 477/3; 477/5; 477/6; 477/7; 477/12; 477/14; 475/1; 475/2; 475/3; 475/4; 475/5

(58) Field of Classification Search ............... 180/65.7, 180/65.6, 65.2, 65.3; 477/1, 3, 6, 7, 14, 5, 477/12; 475/1–5
See application file for complete search history.

(56) References Cited

U.S. PATENT DOCUMENTS

| | | | |
|---|---|---|---|
| 6,176,807 B1 | 1/2001 | Oba et al. | |
| 6,712,165 B1* | 3/2004 | Okazaki | 180/65.2 |
| 6,740,002 B1* | 5/2004 | Stridsberg | 477/14 |
| 2002/0117860 A1 | 8/2002 | Man et al. | |
| 2002/0177504 A1* | 11/2002 | Pels et al. | 477/3 |
| 2003/0183467 A1* | 10/2003 | Kozarekar | 188/380 |

(Continued)

FOREIGN PATENT DOCUMENTS

DE 199 01 470 A1 7/1999

(Continued)

*Primary Examiner*—Christopher P. Ellis
*Assistant Examiner*—John R. Olszewski
(74) *Attorney, Agent, or Firm*—David Bujold & Daniels, P.L.L.C.

(57) ABSTRACT

A method for controlling and regulating a power train of a hybrid vehicle and a power train of a hybrid vehicle having one internal combustion engine, one electric machine, one shifting element and one output in a power flow of the power train and designed with continuously variable transmitting capacity and one clutch device and the internal combustion engine. The electric machine can be operatively interconnected via the clutch device, the hybrid vehicle being optionally driveable via the electric machine and/or via the internal combustion engine and the internal combustion engine can be started via the electric machine. In the operation of the power train, the transmitting capacity of the shifting element during the starting operation of the internal combustion engine is adjusted so that on the output of the power train, a torque abuts which is independent of the starting operation of the internal combustion engine.

17 Claims, 3 Drawing Sheets

U.S. PATENT DOCUMENTS

2004/0084233 A1* 5/2004 Wakuta et al. ............. 180/65.2
2004/0204286 A1* 10/2004 Stridsberg .................... 477/14
2005/0182532 A1* 8/2005 Tobler et al. ................. 701/22
2006/0166772 A1* 7/2006 Kano et al. .................... 475/5
2007/0102211 A1* 5/2007 Nozaki et al. ............. 180/65.7
2007/0114082 A1* 5/2007 Nozaki et al. ............. 180/65.6

FOREIGN PATENT DOCUMENTS

DE      199 41 705 A1    3/2000

* cited by examiner

METHOD FOR CONTROLLING AND REGULATING A POWER TRAIN OF A HYBRID VEHICLE AND POWER TRAIN OF A HYBRID VEHICLE

The invention relates to a method for controlling and regulating a power train of a hybrid vehicle of the kind specifically defined in the preamble of claim 1 and to a power train of a hybrid vehicle of the kind specifically defined in the preamble of claim 13.

Power trains of hybrid vehicles known from the practice mostly have a combination of one internal combustion engine and one electric machine. Compared to merely electric vehicles this configuration lends to a better range and availability for hybrid vehicles. Furthermore, in heavily built-up areas, a drive free of damaging emissions is possible by way of an electric machine. In addition, in certain operating situations, it is possible to drive a hybrid vehicle simultaneously by an internal combustion engine and an electric machine.

In a hybrid vehicle, to reduce a weight increase compared to vehicles having only one internal combustion engine as drive mechanisms, it has been modified in the practice to substitute the electric machine for a starter for the internal combustion engine and a current generator of a hybrid vehicle.

If the hybrid vehicle is driven exclusively by the electric machine, the internal combustion engine is preferably disengaged and separated from the rest of the power train of the hybrid vehicle by a clutch situated between the internal combustion engine and the electric machine. The input torque, required on the output of the hybrid vehicle, is applied only by the electric machine. To start the internal combustion engine, the clutch is closed and the internal combustion engine passed by the electric machine to its starting rotational speed.

On the side of the electric machine, remote from the internal combustion engine, as a rule, one transmission is provided for transmitting and converting the torque produced by the internal combustion engine; the possible constructions of the transmission being multiple and dependent on the driving draft basis of the vehicle.

However, common to all transmissions is the problem of changing the engine rotational speed and the engine torque so that on the input wheels rotational speeds and torques become established which, with sufficiently high input torques or tractions, correspond to the driving speeds desired. The transmission further has the problem of making a reverse drive possible by reversing the direction of rotation of the input wheels.

The above mentioned power trains of hybrid vehicles known from the practice, however, have the disadvantage that the specified starting operation of the internal combustion engine by way of the electric machine results in impairment of the driving comfort, as result of vibrations unexpected by the driver of the input torque abutting on the output of the hybrid vehicle.

Hybrid vehicles are known from the practice in which the input torque abutting on the output is not impaired by a starting operation of the internal combustion engine. The power train of the hybrid vehicles is designed with two electric machines; one of the electric machines being provided in the specified manner as an input unit for the hybrid vehicle and the second electric machine only as starter for the internal combustion engine.

However, power trains of hybrid vehicles thus designed, disadvantageously need large installation space, are too heavy and, due to the additional second electric machine, characterized by elevated production cost.

The problem on which this invention is based is to make a method available for controlling and regulating a power train of a hybrid vehicle and to provide a power train of a hybrid vehicle by way of which the comfort in driving, is improved in a hybrid vehicle, especially during a starting operation of an internal combustion engine and, with installation space required, the same as the production cost of a power drive of a hybrid vehicles can be reduced.

This problem is solved according to the invention with a method having the features of claim 1 and a power train having the features of claim 13.

With the inventive method for controlling and regulating a power train of a hybrid vehicle having one internal combustion engine, one electric machine, one shifting element situated between the electric machine and an output in a power flow of the power train and designed with continuously variable transmitting capacity, and one clutch device located between the electric machine and the internal combustion engine by means of an electric machine and an internal combustion engine can be operatively connected; a power train of a hybrid vehicle can be operated so that a transition from a drive mechanism of the hybrid vehicle by the electric machine and the internal combustion engine or a transition to a pure drive of the hybrid vehicle on the side of the internal combustion engine; the same as a starting operation of the internal combustion engine can be carried out via the electric machine without reaction torques on the side of the power train being noticeable for the driver of the hybrid vehicle.

This is achieved in the operation of the power drive by adjusting the transmitting capacity of the shifting element during a starting operation of the internal combustion engine in a manner such, that on the output of the power train, a torque abuts which is independent of a starting operation of the internal combustion engine.

A change of torque is prevented on the output by inventively adjusting the transmitting capacity of the shifting element so that the torque abutting on the output is only varied, according to the transmitting capacity of the shifting element adjusted at the time and, as a result of an acceleration or a deceleration of the rotational speed of the electric machine during the starting operation of the internal combustion engine. Disadvantageous changes of the torque abutting on the output, which are chiefly to occur as result of a preset driver's wish, can easily be adjusted by changing the transmitting capacity of the shifting element. Due to the starting of the internal combustion engine, torque changes on the output are preferably prevented by a slip operation of the shifting element.

It is thus advantageously possible in the traction operation of the power drive to accelerate the rotatory masses of the electric machine prior to starting of the internal combustion engine when the internal combustion engine is uncoupled from the electric machine without an undesired change of the output torque occurring on the output of a hybrid vehicle.

During the starting operation at the end of the acceleration phase, if the electric machine has the rotatory energy required to start the internal combustion engine, the operative connection between the internal combustion engine and the electric machine is produced via the clutch and, the internal combustion engine can be started via a so-called inertia start without reaction torques detectable by a driver of a hybrid vehicle being started on the power train side.

At the same time, it is provided that the transmitting capacity of the shifting element is reduced, compared to conventional operation of the power train, during the acceleration phase of the electric machine, and the starting phase of the internal combustion engine is kept in a slip operation; the side of the shifting element coordinated with the electric machine is operated at a rotational speed higher than the half of the shifting element coordinated with the output.

In the coasting operation of the power train it is further possible to operate the electric machine departing from the output of the vehicle when the internal combustion engine is uncoupled and to start the internal combustion engine by creating the operative connection between the electric machine and the internal combustion engine via the clutch device when the electric machine has a rotational speed higher than the idling rotational speed of the internal combustion engine without a torque affected by the starting operation of the internal combustion engine abutting on the output of the vehicle.

This means that the rotary masses of the electric machine, driven by the coasting torque existing on the output side when the internal combustion engine is started, are thereby decelerated and, abutting on the output of the vehicle and produced by the general operation of the electric machine, the brake torque is not changed by deceleration of the electric machine when the internal combustion engine is started.

This is achieved by adjusting the transmitting capacity of the shifting element in a manner such that only one pre-defined value of the brake torque of the electric machine is supported by the shifting element on the output of the hybrid vehicle. Thus, during the starting operation of the internal combustion engine, the output of a hybrid vehicle always abuts on a brake torque mainly corresponding to a preset driver's wish or a driving program, which is uncoupled from the starting operation of the internal combustion engine due to the inventively adjusted transmitting capacity of the shifting element.

It is provided that the transmitting capacity of the shifting element is reduced, compared to a conventional operation of the power train and, during the deceleration phase of the electric machine and the starting phase of the internal combustion engine, is kept in slip operation; the side of the shifting element coordinated with the electric machine being operated at a lower rotational speed than the half of the shifting element coordinated with the output.

The inventive power train of a hybrid vehicle is designed, between the internal combustion engine and the electric machine, with a device to dampen rotational irregularities and constitutes a power train of reasonable cost and optimized with regard to installation space, since the device is at least partly integrated in a housing of a transmission of the power train and, in addition, the power train is designed only with one electric machine provided both for starting the internal combustion engine and as input unit for the hybrid vehicle.

Other advantages and advantageous developments of the invention result form the claims and embodiment described in principle with reference to the drawing which shows:

Figure 1:
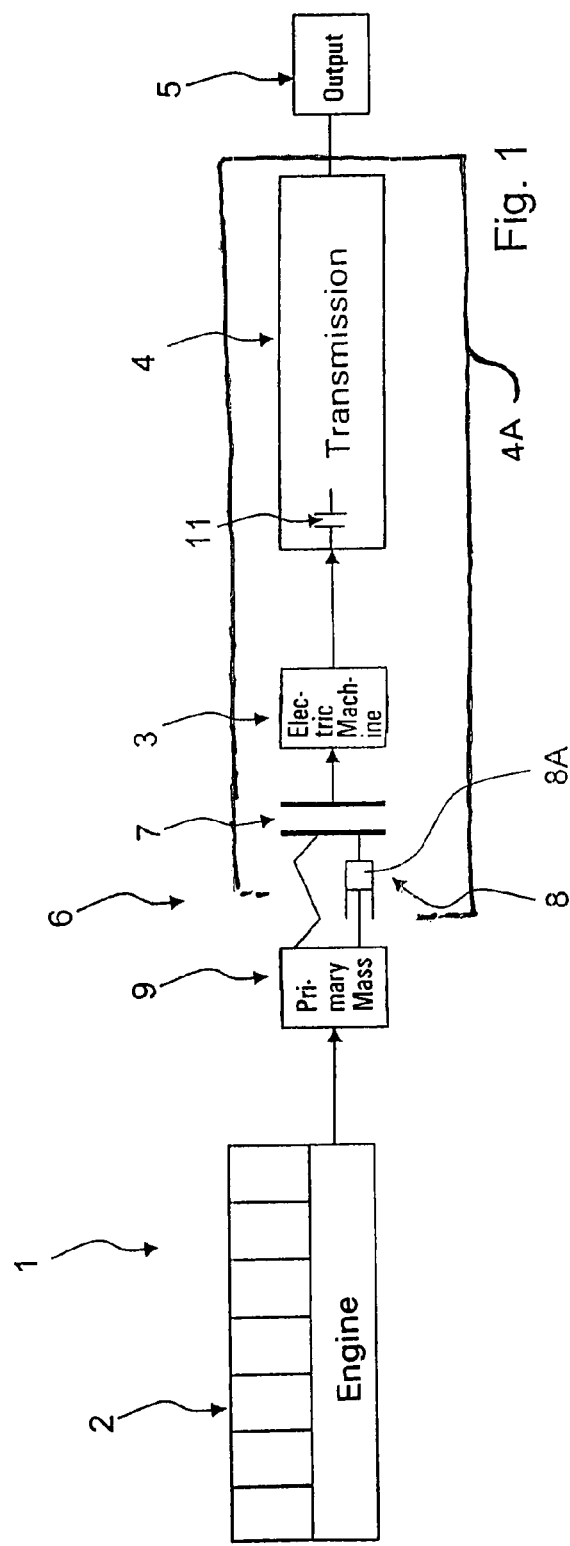
FIG. 1 is an extensively schematized graph of a first embodiment of a power train of a hybrid vehicle.
Figure 3:
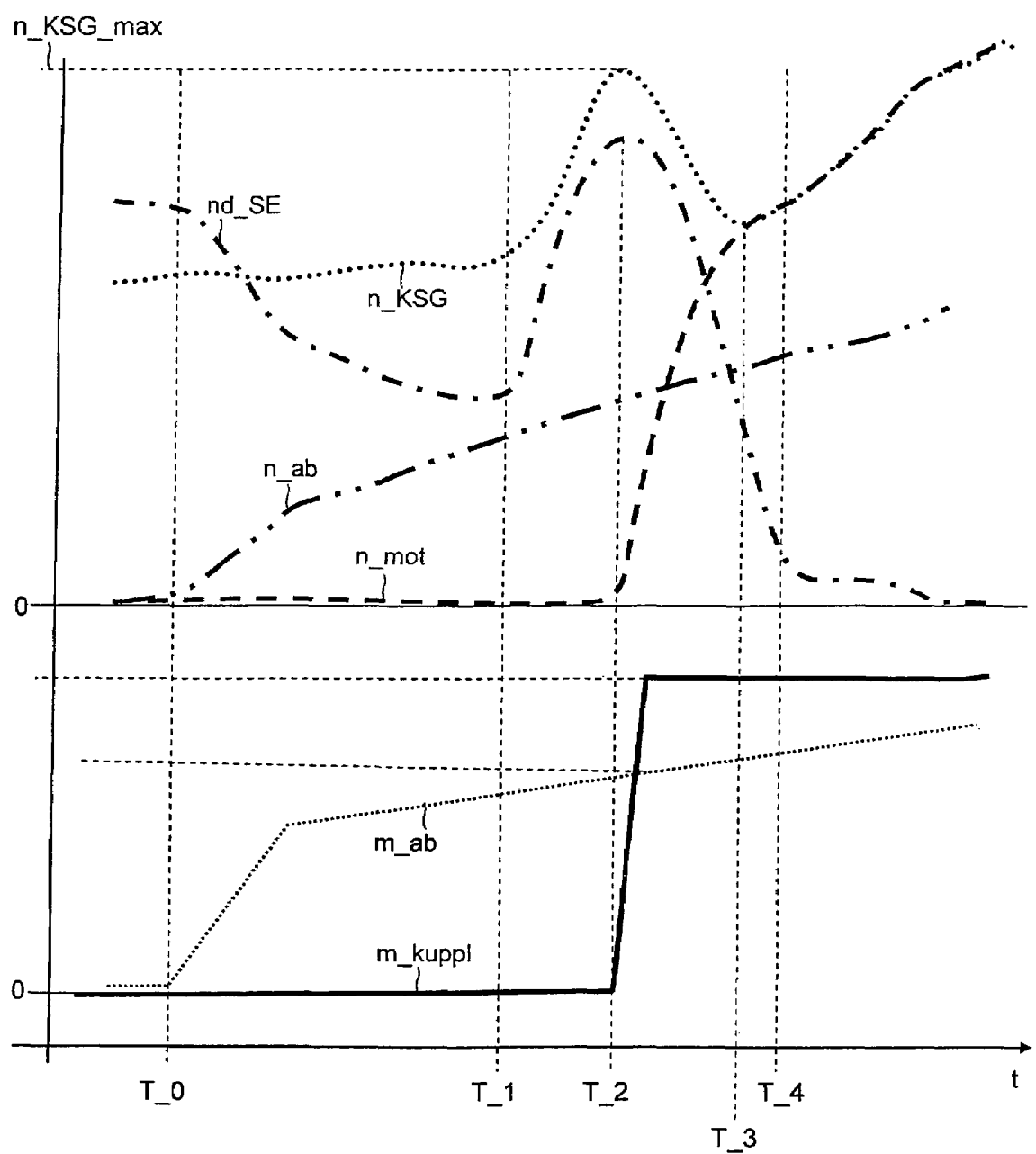
Figure 4:
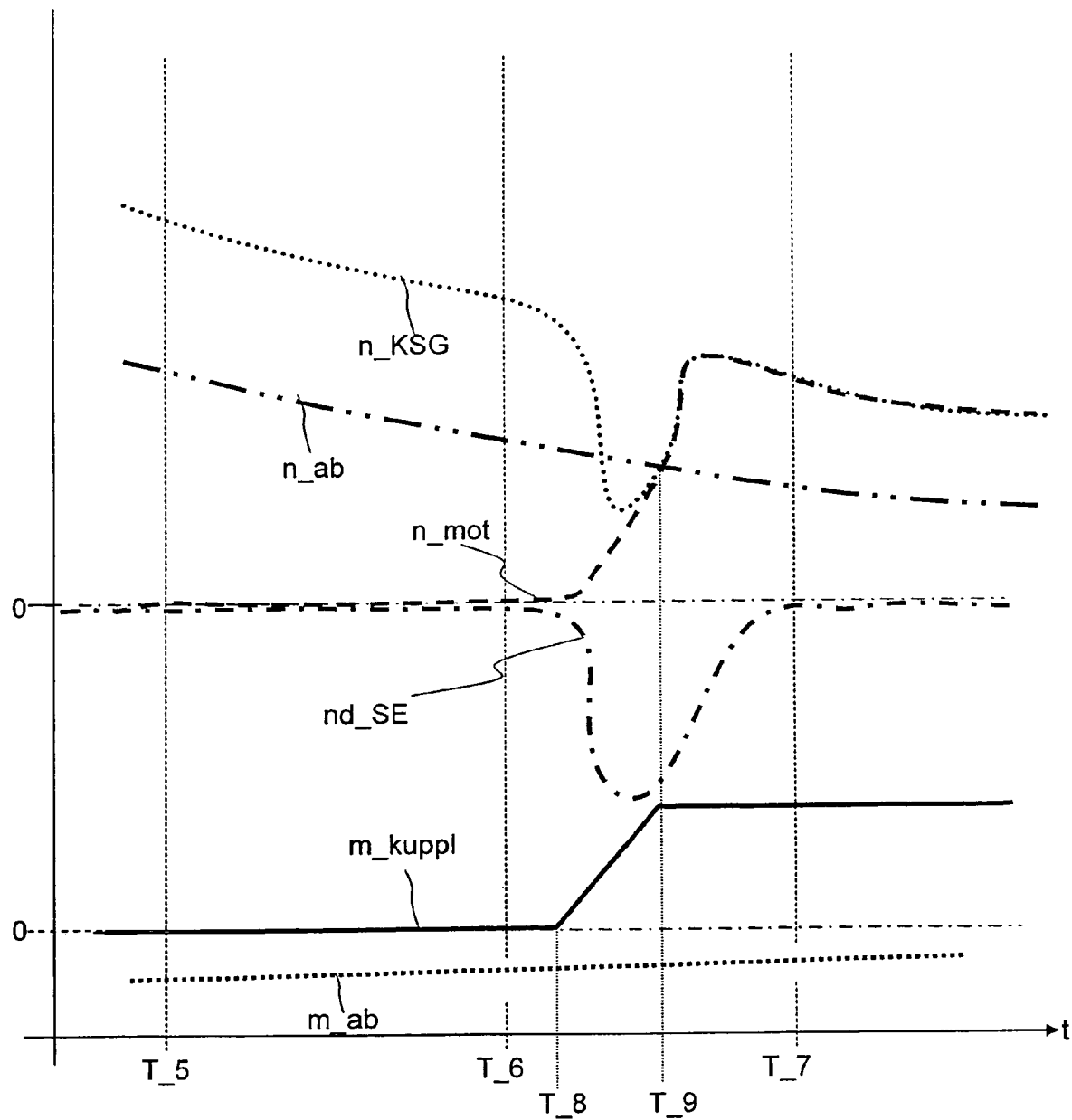

FIG. 3 shows several curves, corresponding with each other, of operating parameters of different components of the power train, shown in FIG. 1, during a starting operation of the internal combustion engine in traction operation; and FIG. 4 shows several curves, corresponding with each other, of operating parameters of different components of the power train, shown in FIG. 1, during a starting operation of the internal combustion engine in the coasting operation of the power train.

FIG. 1 shows an extensively schematized power train of a hybrid vehicle. A power train 1 comprises one internal combustion engine 2, one electric machine 3, one transmission 4 and one output 5. Between the internal combustion engine 2 and the electric machine 3 are situated one device 6 to dampen rotation irregularities and one clutch device 7.

By means of the clutch device 7, an operative connection can be created between the internal combustion engine 2 and the electric machine 3 in order to accomplish possible different operating states of the power train 1 of the hybrid vehicle such as an exclusive input via the electric machine 3, a parallel input via the internal combustion engine 2 and the electric machine 3 or an exclusive input via the internal combustion engine.

By disposing the clutch device 7 between the internal combustion engine 2 and the electric machine 3, just when the electric machine 3 has the rotatory energy required for a starting operation of the internal combustion engine 2, it is possible to attach the internal combustion engine 2 to the electric machine 3 via the clutch device 7 so that the internal combustion engine 2 is started by the electric machine 2.

The device 6 for dampening rotational irregularities, the use of which especially in internal combustion engines designed as Diesel engines increases a driving comfort, has a spring-damper system 8 located between a primary mass 9 and the rotatory masses of the electric machine 3 which constitute a secondary mass of the device 6. The mode of operation of the device 6 for dampening rotational irregularities essentially corresponds to the mode of operation of conventional 2-mass flywheels which dampen rotational irregularities of internal combustion engines which appear due to the changeable combustion processes of the internal combustion engine on the crankshaft thereof. The frequencies produced in the power drive 1, due to rotational irregularities, are removed by the device 6 for dampening rotational irregularities in a manner such that the resonance points are below the idling rotational speed of the internal combustion engine 2 so as not to be noticeable by passengers of the hybrid vehicle.

The transmission 4 is designed as a conventional automatic transmission with integrated starting clutch through which different ratios can be produced, It is possible that the transmission 4 be any transmission known from the practice which can also be combined with a separate starting element such as a hydrodynamic torque converter or a frictional engagement clutch not used for producing a ratio in the automatic transmission.

The clutch device 7 can be designed as magnetic powder clutch, as dry clutch with electric or hydraulic actuator or as multi-disc dry clutch with electric or hydraulic actuator and the clutch device 7 can be any shiftable clutch, known from the practice, and adequate for the case at hand. It is further possible to integrate the clutch device 7 in the housing of the electric machine 3; it being possible; in turn, to integrate the latter in the area of an inlet of the transmission 4 in the housing 4A of the transmission 4.

The structural configuration of the clutch device 7 can correspond to a converter lock-up clutch and is coupled with a sheet metal housing of the electric machine. It is possible preferably to locate the clutch device 7 and the electric machine 3 in the housing 4A of the transmission 4 so that the transmission forms a structural unit with the electric machine or as an easy to mount module.

It is also absolutely possible to integrate the device for dampening rotational irregularities in the transmission whereby the module character of the transmission is further supported in the area of the power train.

An automatic transmission, known from the practice, the same as a regulated lock-up clutch, can be changed in the sense that the electric machine is situated between the combination of the converter lock-up clutch and the hydrodynamic torque converter and the transmission. In this development of the power train, starting operations can be carried out by means of the hydrodynamic torque converter during a movement of the hybrid vehicle on the side of the internal combustion engine.

The design of the power train 1 with one hydrodynamic torque converter has the advantage that the electric machine which, in all described designs of the power train, acts as a so-called crankshaft-starter-generator unit, because of the arrangement inside the transmission can be cooled via the cooling circuit of the transmission 4 and, the operating heat, resulting in the electric machine 3, can easily be discharged to the surroundings.

Alternative to this, the electric machine 3 can obviously be integrated in the transmission 4 in order that the electric machine be cooled via the cool oil budget of the transmission 3 when the clutch device is designed, for example, as magnetic powder clutch, as dry clutch with electric actuator or as multi-disc dry clutch with electric actuator.

The location of the clutch device 7, between the internal combustion engine 2 and the electric machine 3, in addition, constitutes the functionality of an overload protection device for the spring-damper system 8, since the spring-damper system 8, in case of peaks of the input torque in power drive on the side of the internal combustion engine, is loaded up to its maximum layout limit or even beyond it and one damper 8A of the spring-damper system 8 becomes fully immersed and out of commission, there no longer existing in this state any dampening action by the damper 8A, except for inadmissibly high loads of the parts.

This means that the torque, passing into the power train 1 in the area of the spring-damper system 8, is introduced undampened for a specific time in the parts of the spring-damper system 8, which disadvantageously results in undesired high loads of the parts which, under certain circumstances, cause damage to the part.

With the clutch device 7, when such torque peaks occur, it is now possible to brake them down in the clutch device by a brief defined slip, i.e., a brief tear off operation of the clutch device 7, when the clutch device 7 is designed with a continuously variable transmitting capacity like a frictional engagement multi-disc clutch or the like. Compared with the solutions known from the practice, the spring-damper system 8 can thereby be designed with smaller safety factors which basically cause an overside of the system and need of installation space, and the production cost of the system is reduced.

Together with the above described torque peaks in the power train on the side of the internal combustion engine, excessive torque increases in the power train can also occur during certain driving situations such as when running over a curve or when crossing slippery soil, which act in the power train 1 frm the output 5 up to the spring-damper system 8. In this case, it can also be provided that the transmitting capacity of the clutch device 7 be adjusted so that the excessive increases of the torque in the power train 1 in the area of the clutch device 7 can be broken down by a slip operation in the clutch device 7 during the time the torque increases occur and, therefore, is introduced as not undampened at full height in the spring-damper system 8. After occurrence of the torque peaks, the defined slip operation in the clutch device 7 is terminated in order to prevent undesired losses in the power train.

If the structural design of the clutch device 7 corresponds to one of the regulated converter clutch, it can be provided that the clutch device integrated in the housing 4A of the transmission 4A be controlled via a hydraulic control system of the transmission and a tying of pressure be implemented via a hollow drilled input shaft of the transmission 4. The feedback of the clutch device 7 to the sump of the transmission 4 can be developed, e.g., as tube detachment departing from the converter bell of the hydrodynamic torque converter, or as feedback located in a crankshaft sump. It is evidently at the expert's discretion to design the clutch device 7 with its own closed oil circuit when the frictional heat appearing in the clutch device or in the converter clutch can be discharged to the environment in the area of the converter bell.

Figure 2:
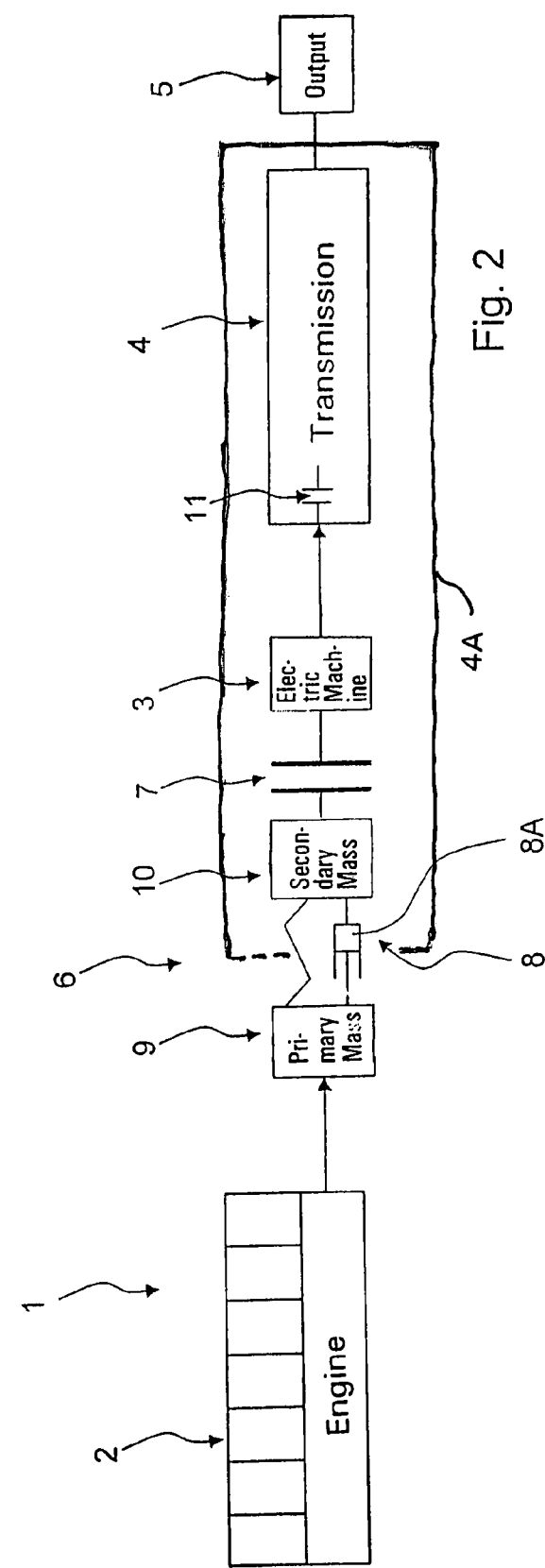
FIG. 2 is an extensively schematized graph of a second embodiment of a power train of a hybrid vehicle.

In FIG. 2, a second embodiment of power train 1 of a hybrid vehicle is shown in a schematized graph, which differs from the power train in the area of the device 6 for dampening rotational irregularities shown in FIG. 1 and from the arrangement of the clutch device 7 in the power flow of the power train 1.

In the power train 1, shown in FIG. 2, the clutch device 7 is situated between the device 6 and the electric machine 3, the spring-damper system 8 being situated between the primary mass 9 and a secondary mass 10 here designed as a separate part of the device 6 for dampening rotational irregularities. The clutch device 7 is located between the secondary mass 10 of the device 6 and the electric machine 3. In this development of the power train 1, it is also possible to integrate the device 6, together with the clutch device 7 and the electric machine 3, in the housing 4A of the transmission 4. It is further possible to coordinate the device 6, which is placed upon the side of the clutch device 7 facing the internal combustion engine 22, with the internal combustion engine 2 and to integrate the clutch device 7, together with the electric machine 3, in the transmission 4.

It is evidently at the expert's discretion adequately to form modules from the separate components of the power train 7 shown in FIG. 1 or in FIG. 2 in order to simplify the assembly of the separate components of the power train in the hybrid vehicle. It is thus absolutely possible to attach the device 6 in the power train 1 shown in FIG. 2 to the internal combustion engine, to integrate the clutch device in the housing of the electric machine and to design the electric machine 3 and the clutch device 7 as a separate module so that it is not integrated in the housing 4A of the transmission 4.

The inventive method for controlling and regulating a power train of a hybrid vehicle is next explained in detail as an example in the traction operation of the power train 1 with reference to the curves shown in FIG. 3 of different operating parameters of the power train 1 according to FIG. 1. Hereafter the inventive method is described with reference to the graph in FIG. 4 during a coasting operation of the power train according to FIG. 1.

FIG. 3 shows several curves, corresponding to each other, of operating parameters of the different components of the power train 1 shown in FIG. 1 during a starting operation of a hybrid vehicle which is at first carried out only via the electric machine 3. As the time t increases, the internal combustion engine 2 is started by means of the electric machine 3 and then used as input unit for driving the hybrid vehicle.

Between moments T_0 and T_1 shown in FIG. 3, a starting operation or starting phase of a hybrid vehicle takes place in which the hybrid vehicle is driven exclusively by the electric machine 3. Departing from the moment T_0, which fundamentally characterizes the starting moment of the starting operation, a differential rotational speed nd_SE of a shifting element 11 of the power train 1, which is also designed as a shifting element for preparing at least one starting ratio of the transmission 4, designed as automatic transmission with continuously variable transmitting capacity, is reduced steadily as time increases down to the moment T_1. An output torque m_ab abutting on the output 5 increases as a result of the increasing transmitting capacity of the shifting element 11.

During the starting operation of the hybrid vehicle, a rotational speed n_KSG of the electric machine 3 takes its course almost constantly according to a driver's power request, while an output rotational speed n_ab between both moments T_0 and T_1 steadily rises due to the increasing output torque m_ab.

Furthermore, a rotational speed n_mot of the internal combustion engine 2, the same as a torque m_kuppl conveyable via the clutch device 7, are zero during the starting phase or at least near zero due to drag torques acting between the two clutch halves of the clutch device 7, since the transmitting capacity of the clutch device 7 is adjusted so that almost no torque can be conveyed via the clutch device 7 and the internal combustion engine 2 is disengaged.

At the moment T_1, a starting phase for the internal combustion engine begins with a so-called preparation phase for a swing start of the internal combustion engine 2 via the electric machine 3; the control and regulation of the power train 1 developing in the manner described below so as to prevent in the power train 1 during the starting phase reaction torques on the power train side perceptible for a driver.

At the moment T_1, the rotational speed n_KSG of the electric machine 3 is increased to a predefined rotational speed value n_KSG_max at which the electric machine 3 has a rotatory energy such that the internal combustion engine 2, during activated operative connection between the electric machine 3 and the internal combustion engine 2, is brought by the electric machine 3 to its starting rotational speed without reactions impairing the driving comfort being noticeable for the driver.

At the same time, a transmitting capacity of the shifting element 11 situated in the power flow of the power train 1, which is the above mentioned starting element of the power train 1 integrated in the transmission 4, or of one shifting element with continuously variable transmitting capacity like a frictional engagement multi-disc clutch or the like, which is in the power flow of the power train for producing the ratio to be actually introduced in the transmission 4, is adjusted so that the rise of rotational speed n_KSG of the electric machine 3 does not result in any change of the output torque m_ab abutting on the output 5.

This is achieved by adjusting the transmitting capacity of the shifting element 11 of the power train 1 so as to compensate the increase of the input torque generated by the electric machine 3 in the area of the starting element by a defined slip operation and, in direction of the output 4, is relayed only the portion of the input torque of the electric machine 3 which preferably corresponding to a driver's power request or to a driving program used for controlling the power train and to the momentary operating state, conforms with the rotational speed to be relayed to the output 5. It is thus ensured that during the whole starting phase, the desired output torque abuts on the output 5. The slip operation of the starting element of the transmission 4, adjusted under control and regulation, is graphically reproduced in FIG. 3 by the curve of the differential rotational speed nd_SE of the shifting element after the moment T_1.

At the moment T_2, the transmitting capacity of the clutch device 7 is raised via a ramp function to an upper value of the transmitting capacity at which the internal combustion engine 2 is coupled with the electric machine 3. An input torque of the internal combustion engine 2 can then be passed in direction of the output 5 without slip in the clutch device 7 via the clutch device 7. Diverging from this, the transmitting capacity of the clutch device 7 can also be brought via other suitable functions to the required value.

The increase of transmitting capacity of the clutch device 7 is implicitly shown graphically by the curve of the input torque m_kuppl conveyable via the clutch device 7, the increase of the torque m_kuppl conveyable via the clutch device 7 producing a reduction of the rotational speed n_KSG of the electric motor 3 and of the differential rotational speed nd_SE of the shifting element 11, since an increasing portion of the input torque of the electric machine 3 is passed in direction of the internal combustion engine 2. With the increasing transmitting capacity of the clutch device 7, the rotational speed n_mot of the internal combustion engine 2 rises, the attachment of the rotatory masses of the internal combustion engine 2 to the electric machine 3 producing the reduction of the rotational speed n_KSG of the electric machine 3 and the lowering of the differential rotational speed nd_SE of the shifting element 11.

At a moment T_3, the rotational speed n_mot of the internal combustion engine 2 corresponds to the rotational speed n_KSG of the electric machine 3 and the clutch device 7 is synchronous. At a moment T_4, the shifting element 11 is almost synchronous there occurring after the moment T_4 a regulation of the rotational speed nd_SE of the shifting element 11 by a corresponding conveyance of the rotational speed n_mot of the internal combustion engine 2 which is assumed by a motor engagement. In synchronous state of the shifting element 11, the transmitting capacity of the shifting element 11 is adjusted so that the output torque m_ab abutting on the output 5 varies depending on the torque delivered by the internal combustion engine 2 and/or the electric machine 3. This means that the torque m_ab abutting on the output 5 is no longer controlled and regulated via the slip adjusted in the shifting element 11.

Depending on the control logic of the power train 1, thereafter it is possible to use the internal combustion engine 2 and the electric machine 3 simultaneously to drive the hybrid vehicle or to drive only via the internal combustion engine 2 or the electric machine 3. Via the internal combustion engine 3, if a torque is produced that is higher than a required output torque, it is generally possible to operate the electric machine 3 and to feed the electric energy produced by the electric machine 3 to an energy accumulator of the hybrid vehicle.

The above designated predefined rotational speed value n_KSG_max needed for starting the internal combustion engine 2 by the electric machine 3 is calculated according to the operating state of the power train 1 actually existing from the rotatory energy of the electric machine 3 required for the starting operation of the internal combustion engine 2. In this calculation of the rotational speed value n_KSG_max of the electric machine 3, it is additionally taken into account that during the starting operation a synchronization point of the shifting element 11 of the transmission 4 which, during the acceleration operation of the electric machine 3 after the moment T_1 is operated in slip state, after engagement of the clutch device 7 has not been reached or fallen below, since when the synchronization point has been fallen below, a load change occurs in the power train 1 from a traction operation to a coasting operation with the consequence of undesired reactions in the power train, especially in the area of the toothing.

This results from the fact that during the acceleration phase of the electric machine 3, while the starting element of the transmission 4 is slippingly operated, an input rotational speed of the starting element, i.e., one half of the starting element in operative connection with the electric machine 3, rotates at a higher speed than the half of the starting element corresponding therewith which is connected with the output 5 of the power train 1. In this operating state of the starting element, at the time a value of the output torque is fed at the output 5 which, depending on the adjusted transmitting capacity of the starting element, corresponds to the input torque actually delivered by the electric machine 3 and essentially independent thereof. This state exists during the state of the starting element, here designated as positive slip operation of the starting element, up to the synchronization point of the starting element. This means that the output torque abutting on the output 5 is independent in the positive slip operation of the starting element of the torque vibrations appearing in the part of the power train 1 which is between the starting element and the internal combustion engine 2.

By the closing of the clutch device 7 and the starting of the internal combustion engine 2 occurring therewith, due to the inertia of the rotatory masses of the part of the power train 1 on the side of the clutch device 7 remote from the output 5 which are engaged by the clutch device 7, if the part of the power train 1, on the side of the internal combustion engine, is decelerated so that the starting element reaches its synchronization point or even falls below it, the output torque on the output diminishes against a driver's power request or any other control presetting, but this is undesired.

The load change, occurring in the power train 1 when the synchronization point of the starting element is fallen below, which in the operation of the power train 1, represents an occurrence that reduces the driving comfort and under certain circumstances a driver of the hybrid vehicle feels as shock or impact, also results in brief undesired loads of the part. Such a shock or impact depends on elasticities and tolerances of the individual parts of the power train which, because of the multiplicity of parts, add up to a not inconsiderable amount.

It is to be noted, especially in the area of the toothings, that during a load change, the contact between two gear wheels engaged with each other changes from one flank of the teeth to the respective other flank. During this change the parts re-align themselves. During their alignment, the parts are in load-free state in which the parts are accelerated unbraked. If the toothings again come into contact on their respective opposite tooth flanks, they are abruptly decelerated. The quicker and undampened such a load change occurs, the harder is the impact when applied to the tooth flanks.

Especially in the traction operation of a power train of a hybrid vehicle and during a starting operation of the internal combustion engine by the electric machine, a good driving quality is sought since the driver expects no remarkable reaction on th side of the power train.

Such reactions are easily prevented by the above described method since, in the power train 1 of a hybrid vehicle by means of the starting element or of any other shifting element in the power flow of the power train, the inventive procedure can make an elasticity available in the power train, such that thereby the reactions on the side of the power train which reduce the driving quality can be dampened in the power train.

This means that in the course of the inventive method, the rotational speed value n_KSG_max to which is raised the rotational speed n_KSG of the electric machine 3 during the starting phase of the internal combustion engine 2, is calculated via an algorithm implemented in the engine control and/or in the transmission control and/or in a superposed torque manager so as to prevent with certainty the falling below of the synchronization point of the starting element during the starting operation of the internal combustion engine.

FIG. 4 shows the curves shown in FIG. 3 of the operating parameters of the different components of the power train 1 shown in FIG. 1 during a coasting operation of the power train 1 wherein on the output 5 of the power train 1, a brake torque first abuts, that counteracts the coasting torque and is produced via the generatorily operated electric machine 3. As the time t increases, the internal combustion engine 2 is started by means of the electric machine 3 and then used as engine brake for braking the hybrid vehicle.

Between the moments T_5 and T_6 shown in FIG. 4, a coasting drive takes place with disengaged internal combustion engine 2 of a hybrid vehicle during which a brake torque that counteracts the coasting torque is produced only by the electric machine 3 on the output 5 of a hybrid vehicle.

At the moment T_6, which represents the starting time point for a preparation phase of the power train 1 for a swing start of the internal combustion engine 2 by the electric machine 3, the transmitting capacity of the shifting element 11 is reduced so that the differential rotational speed nd_SE, when the clutch device 7 has a transmitting capacity at which essentially no torque can be passed via the clutch device 7, is synchronous and the brake torque generated by the electric machine 3 is supported on the output 5 via the shifting element 11.

The brake torque of the electric machine 3 passed via the shifting element 11 corresponds here to a preset driver's wish or to a presetting of a drive program stored in a control device. The transmitting capacity of the clutch device 7 is then raised so that the internal combustion engine 2 is increasingly driven by the electric machine 3. The torque m_kuppl transmitted by the clutch device 7 increasingly rises at the same time in the manner shown in FIG. 4 between the moment T_6 and a moment T_7; the rotational speed n_KSG of the electric machine decreasing as the transmitting capacity of the clutch device 7 increases and the rotational speed n_mot of the internal combustion engine 2 is raised.

Due to the fact that by creating the operative connection between the electric machine 3 and the internal combustion engine 2 via the clutch 7, increasing torque is transmitted from the electric machine 3 to the internal combustion engine 2, the brake torque abutting on the half of the shifting element 11 facing the electric machine 3 being higher than was the case prior to engaging the internal combustion engine 2. Since the transmitting capacity of the shifting element 11 prior to engagement of the internal combustion engine 2 was reduced so that only one predefined torque value can be supported via the shifting element 11 on the output 5, the shifting element 11 changes over to a slip operation, which is graphically reproduced in FIG. 4 by an increase of the differential rotational speed nd_SE of the shifting element 11.

The shifting element 11 has a slip defined here so that, the same as prior to the engagement of the internal combustion engine 3, the torque value supported on the output 5 abuts via the shifting element 11 on the output 5. The driver cannot notice any reaction torques caused by the starting operation of the internal combustion engine 2 due to a change of the brake torque supported on the output 5.

To attach the internal combustion engine 2 to the electric machine 3 at a moment T_8, the transmitting capacity of the clutch device 7 is increased, via a ramp function, to an upper value of the transmitting capacity at which the internal combustion engine 2 is connected with the electric machine 3. Thereafter an input torque of the internal combustion engine 2 can be conveyed without slip to the clutch device 7 in direction of the output 5 via the clutch device 7. Diverging from this, the transmitting capacity of the clutch device 7 can also be brought to the required value via other suitable functions.

The increase of the transmitting capacity of the clutch device 7 is graphically shown in FIG. 4 by a curve of the input torque m_kuppl conveyable via the clutch device 7. The increase of the torque m_kuppl conveyable, via the clutch device 7, producing a reduction of the rotational speed n_KSG of the electric machine 3 and of the differential speed nd_SE of the shifting element 11 of the transmission 4 and an increasing portion of the coasting torque of the output 5, which drives the electric machine 3, being conveyed in direction of the internal combustion engine 2. Moreover, as the transmitting capacity of the clutch device 7 increases, the rotational speed n_mot of the internal combustion engine 2 rises, the fastening of the rotatory masses of the internal combustion engine 3 to the electric machine 2 producing the reduction of the rotational speed n_KSG of the electric machine 3 and the increase of the differential rotational speed nd_SE of the shifting element 11.

At a moment T_9, the rotational speed n_mot of the internal combustion engine 2 corresponds to the rotational speed n_KSG of the electric machine 3 and the clutch device 7 is synchronous. At the moment T_7, the shifting element 11 is almost synchronous there occurring after the moment T_7 a regulation of the differential rotational speed n_mot of the internal combustion engine 2 which is assumed by an engine engagement. In synchronous state of the shifting element 11, the transmitting capacity of the shifting element 11 is adjusted so that the brake torque abutting on the output 5 varies according to the brake torque generated by the internal combustion engine 2 and/or the electric machine 3. This means that the brake torque abutting on the output 5 is no longer controlled and regulated via the slip adjusted in the shifting element 11.

According to the control logic of the drive train 1, thereafter it is possible to use the internal combustion engine 2 and the electric machine 3 simultaneously for producing a brake torque or as engine brake of the hybrid vehicle or to use only the internal combustion engine 2 or the electric machine 3 as engine brake. The shifting element 11 which, in the drive trains according to FIG. 1 and FIG. 2, is integrated in the transmission 4, in other embodiments of the inventive drive train can obviously be situated in the power flow of the drive train also as separate shifting element before or after the transmission 4 between the electric machine 3 and the output 5 of the drive train in order to be able to make available in the power train in the area between the electric machine 3 and the output 5 an elasticity such that during a starting operation of the internal combustion engine 2 no reaction torques resulting from the starting operation of the internal combustion engine 2 can be detected by the driver.

| Reference numerals | | |
|---|---|---|
| 1 power train | m_kuppl | clutch device torque |
| 2 internal combustion engine | nd_SE | differential rotational speed of shifting element |
| 3 electric machine | | |
| 4 transmission | | |
| 5 output | n_ab | output rotational speed |
| 6 dampening device for rotational irregularities | n_KSG | electric machine rotational speed |
| 7 clutch device | n_KSG_max | defined rotational speed value |
| 8 spring-damper system | | |
| 9 primary mass | n_mot | internal combustion engine rotational speed |
| 10 secondary mass | | |
| 11 shifting element | T_0-T-9 | discrete moment |
| m_ab output torque | t | time |

The invention claimed is:

1. A method of controlling and regulating a power train (1) of a hybrid vehicle having one internal combustion engine (2), an electric machine (3), a shifting element (11) with a continuously variable transmitting capacity which is disposed in a power flow of the power train (1) between the electric machine (3) and an output (5) of the power train (1), and a clutch device (7) located between the electric machine (3) and the internal combustion engine (2) which facilitates operative connection of the internal combustion engine (2) with the electric machine (3) so that the hybrid vehicle can optionally be driven by at least one of the electric machine (3) and the internal combustion engine (2), the method comprising the steps of:

establishing the operative connection by actuation of the clutch device (7), during a starting operation of the internal combustion engine (2), between the electric machine (3) and the internal combustion engine (2) to start the internal combustion engine (2) by operation of the electric machine (3), adjusting a transmitting capacity of the shifting element (11), during the starting operation of the internal combustion engine (2), so that a torque, independent of the starting operation of the internal combustion engine (2), is transmitted to an output of the power train (1), and during a traction operation of the power train (1), when the clutch device (7) has a transmitting capacity at which essentially no torque can be conveyed via the clutch device (7), increasing an input torque of the electric machine (3), during the starting operation of the internal combustion engine (2), and adjusting the transmitting capacity of the shifting element (11) so that a torque independent of an increase of the input torque of the electric machine (3) is transmitted to the output of the power train (1).

2. The method according to claim 1, further comprising the step of adjusting, during the starting operation of the internal combustion engine (2), the transmitting capacity of the shifting element (11) so that the shifting element (11) is slippingly operated during the increase of the input torque of the electric machine (3) and only one part of the input torque of the electric machine (3) is conveyed via the shifting element (11) in a direction of the output (5).

3. A method of controlling and regulating a power train (1) of a hybrid vehicle having one internal combustion engine (2), an electric machine (3), a shifting element (11) with a continuously variable transmitting capacity which is disposed in a power flow of the power train (1) between the electric machine (3) and an output (5) of the power train (1), and a clutch device (7) located between the electric machine (3) and the internal combustion engine (2) which facilitates operative connection of the internal combustion engine (2) with the electric machine (3) so that the hybrid vehicle can optionally be driven by at least one of the electric machine (3) and the internal combustion engine (2), the method comprising the steps of:

establishing the operative connection by actuation of the clutch device (7), during a starting operation of the internal combustion engine (7), between the electric machine (3) and the internal combustion engine (2) to start the internal combustion engine (7) by operation of the electric machine (3), adjusting a transmitting capacity of the shifting element (11), during the starting operation of the internal combustion engine (7), so that a torque, independent of the starting operation of the internal combustion engine (2), is transmitted to an output of the power train (1), and increasing an input torque of the electric machine (3) to a rotational speed value (n_KSG_max) equivalent to a rotatory energy of the electric machine (3) required to start the internal combustion engine (2).

4. The method according to claim 3, further comprising the step of, when the rotational speed value (n_KSG_max) of the electric machine (3) is reached, raising the transmitting capacity of the clutch device (7) so that the internal combustion engine (2) is started by the electric machine (3).

5. The method according to claim 3, further comprising the step of corresponding the rotational speed (n _KSG_max) of the electric machine (3) at least to a value such that a load change of the power train (1) from a traction operation to a coasting operation is omitted during the starting operation of the internal combustion engine (2).

6. A method of controlling and regulating a power train (1) of a hybrid vehicle having one internal combustion engine (2), an electric machine (3), a shifting element (11) with a continuously variable transmitting capacity which is disposed in a power flow of the power train (1) between the electric machine (3) and an output (5) of the power train (1), and a clutch device (7) located between the electric machine (3) and the internal combustion engine (2) which facilitates operative connection of the internal combustion engine (2) with the electric machine (3) so that the hybrid vehicle can optionally be driven by at least one of the electric machine (3) and the internal combustion engine (2), the method comprising the steps of:

establishing the operative connection by actuation of the clutch device (7), during a starting operation of the internal combustion engine (2), between the electric machine (3) and the internal combustion engine (2) to start the internal combustion engine (2) by operation of the electric machine (3), adjusting a transmitting capacity of the shifting element (11), during the starting operation of the internal combustion engine (2), so that a torque, independent of the starting operation of the internal combustion engine (2), is transmitted to an output of the power train (1), and during a starting operation occurring during a coasting operation of the drive train (1), adjusting the transmitting capacity of the shifting element (1), during the starting operation of the internal combustion engine (2), so that a reduction of an input torque of the electric machine (3) occurring during the starting operation of the internal combustion engine (2) in an area of the shifting element (11) is compensated by a slip operation of the shifting element (11).

7. The method according to claim 6, further comprising the step of carrying out, during a coasting operation of the power train (1) and upon an occurrence of a brake torque counteracting a coasting torque of the output (5), the starting operation of the internal combustion engine (2) when a rotational speed (n_KSG) of the electric machine (3) is higher than an idling rotational speed of the internal combustion engine (2).

8. The method according to claim 6, further comprising the step of controlling and regulating the transmitting capacity of the shifting element (11), during the starting operation of the internal combustion engine (2), so that a predefined brake torque to be applied to the output (5) by the electric machine (3) is supported on the output (5) by the electric machine (3).

9. The method according to claim 3, further comprising the step of adjusting the transmitting capacity of the shifting element (11) so that the torque abutting on the output (5) corresponds to a driver's power request.

10. The method according to claim 3, further comprising the step of adjusting the transmitting capacity of the shifting element (11) so that the torque abutting on the output (5) corresponds to a torque value preset by a driving program.

11. The method according to claim 3, further comprising the step of controlling and regulating the internal combustion engine (2), after starting, so that a rotational speed (n_mot) of the internal combustion engine (2) is higher than or equal to a synchronous rotational speed of the shifting element (11).

12. A power train (1) of a hybrid vehicle, comprising:

an internal combustion engine (2), an electric machine (3), a transmission (4) having a shifting element (11) having a continuously variable transmitting capacity and disposed in a power flow of the power train (1) between the electric machine (3) and an output (5), and a clutch device (7) situated between the electric machine (3) and the internal combustion engine (2) by which the electric machine (3) and the internal combustion engine (2) can be brought to operative connection, and a device (6) located between the internal combustion engine (2) and the electric machine (3) for dampening rotational irregularities and is at least partly integrated in a housing of the transmission (4), whereby the hybrid vehicle is selectably driven by at least one of the electric machine (3) and the internal combustion engine (2) and whereby the internal combustion engine (2) can be started by means of the electric machine (3) by creating a connection between the electrical machine (3) and the internal combustion engine (2) via the clutch device (7), and by one of during a starting operation of the internal combustion engine (2), adjusting the transmitting capacity of the shifting element (11) during the internal combustion engine (2) starting operation so that a torque independent of the starting operation of the internal combustion engine (2) is transmitted to an output of the power train (1), and during a coasting operation of the drive train (1), adjusting the transmitting capacity of the shifting element (1) so that a reduction of an input torque of the electric machine (3) occurring during the starting operation of the internal combustion engine (2) in an area of the shifting element (11) is compensated by a slip operation of the shifting element (11).

13. The power train according to claim 12, wherein the device (6) for dampening rotational irregularities has at least one primary mass (9) and one secondary mass (10) which are coupled with each other via a spring-damper system (8).

14. The power train according to claim 13, wherein the clutch device (7) is situated between the primary mass (9) and the secondary mass, the primary mass (9) being disposed upon a side of the clutch device (7) facing the internal combustion engine (2) and the secondary mass upon a side of the clutch device (7) remote from the electric machine (3).

15. The power train according to claim 14, wherein rotatory masses of the electric machine (3) from the secondary mass of the device (6) r dampen rotational irregularities.

16. The power train according to claim 12, wherein both the clutch device (7) and the device (6) for dampening rotational irregularities are integrated in the housing of the transmission (4).

17. The power train according to claim 12, wherein the shifting element (11) is situated in the power flow of the power train (1) departing from the electric machine (3) in one of a direction of the output (5) before, in, or after the transmission (4).

* * * * *